United States Patent
Bond

(10) Patent No.: US 11,521,348 B2
(45) Date of Patent: Dec. 6, 2022

(54) TRANSFORMING SENSOR DATA TO TRAIN MODELS USED WITH DIFFERENT SENSOR CONFIGURATIONS

(71) Applicant: GM GLOBAL TECHNOLOGY OPERATIONS LLC, Detroit, MI (US)

(72) Inventor: Jacob A. Bond, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/194,382

(22) Filed: Mar. 8, 2021

(65) Prior Publication Data
US 2022/0284662 A1 Sep. 8, 2022

(51) Int. Cl.
*G06T 15/20* (2011.01)
*G06N 20/00* (2019.01)

(52) U.S. Cl.
CPC ........... *G06T 15/205* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,920,959 | B1* | 4/2011 | Williams | G08G 1/056 345/614 |
| 2008/0310677 | A1* | 12/2008 | Weismuller | G06T 7/215 382/103 |
| 2019/0384303 | A1* | 12/2019 | Muller | G01C 21/3407 |
| 2021/0027103 | A1* | 1/2021 | Brower | G06K 9/6271 |
| 2021/0383096 | A1* | 12/2021 | White | G06V 20/647 |
| 2022/0083841 | A1* | 3/2022 | Isele | G01S 7/4021 |

\* cited by examiner

*Primary Examiner* — Nurun Flora

(57) ABSTRACT

A system includes a processor and a memory storing instructions which when executed by the processor configure the processor to receive first data from a first set of sensors arranged in a first configuration. The instructions configure the processor to transform the first data to a second data to train a model to recognize third data captured by a second set of sensors arranged in a second configuration. The second configuration is different than the first configuration. The instructions configure the processor to train the model based on the second set of sensors sensing the second data to recognize the third data captured by the second set of sensors arranged in the second configuration.

16 Claims, 3 Drawing Sheets

TRANSFORMING SENSOR DATA TO TRAIN MODELS USED WITH DIFFERENT SENSOR CONFIGURATIONS

INTRODUCTION

The information provided in this section is for the purpose of generally presenting the context of the disclosure. Work of the presently named inventor, to the extent it is described in this section, as well as aspects of the description that may not otherwise qualify as prior art at the time of filing, are neither expressly nor impliedly admitted as prior art against the present disclosure.

The present disclosure relates to transforming sensor data from a given sensor configuration into arbitrary other frames of reference to train models used with different sensor configurations.

In many applications, models (e.g., machine learning-based models) are trained using data collected by sensors. In use, a trained model receives data from the sensors and outputs data that the model is trained to output based on the data received from the sensors. For example, in automotive applications (e.g., autonomous driving applications), models are trained using data collected by various sensors (e.g., cameras) mounted on a vehicle. The sensors collect data while the vehicle is being driven on roads. The collected data is used to train a model. The trained model is deployed in the vehicles. In use, the trained model receives data from the sensors and outputs data that the model is trained to output.

SUMMARY

A system comprises a processor and a memory storing instructions which when executed by the processor configure the processor to receive first data from a first set of sensors arranged in a first configuration. The instructions configure the processor to transform the first data to a second data to train a model to recognize third data captured by a second set of sensors arranged in a second configuration. The second configuration is different than the first configuration. The instructions configure the processor to train the model based on the second set of sensors sensing the second data to recognize the third data captured by the second set of sensors arranged in the second configuration.

In another feature, the trained model recognizes the third data captured by the second set of sensors arranged in the second configuration.

In another feature, at least one of the second set of sensors is different than at least one of the first set of sensors.

In other features, the instructions configure the processor to detect one or more objects in the first data and to separate the objects from background in the first data.

In other features, the instructions configure the processor to transform perspectives of the objects from 2D to 3D using a machine learning based model and to transform a perspective of the background from 2D to 3D using a computer graphics technique.

In another feature, the instructions configure the processor to combine the transformed perspectives of the objects and the transformed perspective of the background to generate a 3D scene representing the first data.

In another feature, the instructions configure the processor to train the model based on the second set of sensors sensing the 3D scene representing the first data.

In other features, the instructions configure the processor to generate 2D representations of the 3D perspectives of the objects sensed by the second set of sensors and to generate a 2D representation of the 3D perspective of the background sensed by the second set of sensors.

In another feature, the instructions configure the processor to combine the 2D representations of the 3D perspectives of the objects and the 2D representation of the 3D perspective of the background sensed by the second set of sensors.

In another feature, the instructions configure the processor to train the model based on the combination of the 2D representations of the 3D perspectives of the objects and the 2D representation of the 3D perspective of the background sensed by the second set of sensors.

In still other features, a method comprises receiving first data from a first set of sensors arranged in a first configuration. The method comprises transforming the first data to a second data that reflects the first data as perceived by a second set of sensors arranged in a second configuration. The second configuration is different than the first configuration. The method comprises training a model by sensing the second data using the second set of sensors to recognize third data captured by the second set of sensors arranged in the second configuration.

In another feature, the method further comprises recognizing, using the trained model, the third data captured by the second set of sensors arranged in the second configuration.

In another feature, at least one of the second set of sensors is different than at least one of the first set of sensors.

In other features, the method further comprises detecting one or more objects in the first data and separating the objects from background in the first data.

In other features, the method further comprises transforming perspectives of the objects from 2D to 3D using a machine learning based model and transforming a perspective of the background from 2D to 3D using a computer graphics technique.

In another feature, the method further comprises combining the transformed perspectives of the objects and the transformed perspective of the background to generate a 3D scene representing the first data.

In another feature, the method further comprises training the model based on the second set of sensors sensing the 3D scene representing the first data.

In other features, the method further comprises generating 2D representations of the 3D perspectives of the objects sensed by the second set of sensors and generating a 2D representation of the 3D perspective of the background sensed by the second set of sensors.

In another feature, the method further comprises combining the 2D representations of the 3D perspectives of the objects and the 2D representation of the 3D perspective of the background sensed by the second set of sensors.

In another feature, the method further comprises training the model based on the combination of the 2D representations of the 3D perspectives of the objects and the 2D representation of the 3D perspective of the background sensed by the second set of sensors.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 2:
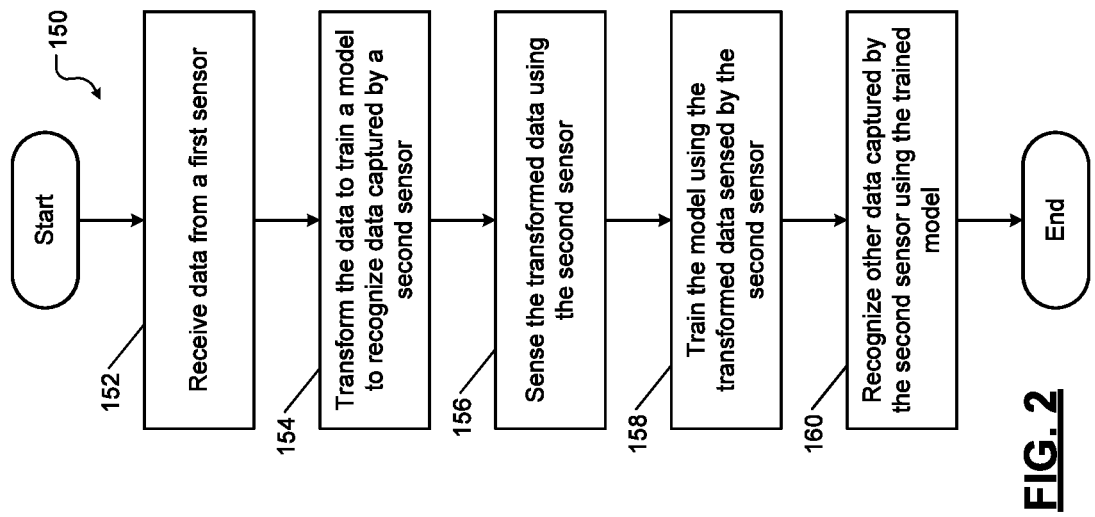
FIG. 2 shows an overall method for transforming sensor data to train models used with different sensor configurations according to the present disclosure.

Sensors (e.g., cameras) may be configured differently on different types of vehicles (e.g., sedans, trucks, sports utility vehicles etc.). Accordingly, data sensed by the sensors on one type of vehicle (e.g., a sedan) may be different in many respects relative to data sensed by sensors on another type of vehicle (e.g., a truck). As a result, a model (e.g., a machine learning-based model) trained using data collected by sensors configured for one type of vehicle may not produce correct outputs when data from sensors configured differently for another type of vehicle is input to the trained model.

For example, cameras may be mounted differently on sedans than on trucks or sports utility vehicles. Therefore, images of a scene captured by the cameras on sedans may be different than images of the same scene captured by the cameras on the trucks or sports utility vehicles. For example, perspectives of the images captured by the cameras on sedans may be different than perspectives of the images captured by the cameras on the trucks or sports utility vehicles. As a result, a model (e.g., a machine learning-based model) trained using images captured by cameras configured for one vehicle model may not produce accurate outputs when images captured by cameras configured differently for another type of vehicle are input to the trained model.

Accordingly, first data from a first sensor configuration can be used to train a first model; and the first trained model can be used with the first sensor configuration to produce accurate results based on data sensed by the first sensor configuration. However, the first data cannot be reused to train a second model that is used with a second sensor configuration. If the first data is used to train the second model, when the second trained model is used with the second sensor configuration, the output of the second trained model based on receiving second data from the second sensor configuration as input may not be accurate.

The present disclosure provides a system and methods that solve the above problem. The system and methods convert sensor data collected from one sensor configuration into sensor data viewed from a different reference frame. Specifically, the system and methods use perspective transformations or machine learning techniques to perform this transformation. Having transformed the data to a new reference frame, the transformed data can train a model (e.g., a machine learning-based model) that can be deployed with a different sensor configuration.

Current perspective transformation and data augmentation methods are limited to images and use of computer graphics techniques. In contrast, the system and methods of the present disclosure supplement computer graphics techniques with machine learning techniques for performing frame of reference transformations of 3D scenes. The system and methods use perspective transformations and machine learning for transformation of video, radar, Lidar, and other non-still image media.

More specifically, the system and methods perform perspective transformations on sensor data by separating Objects of Interest (OoI) from background for each sensor modality using object detection techniques. The system and methods transform the perspective of the OoI using machine learning techniques and transforms the perspective of the background using computer graphics techniques. The system and methods recombine the OoI and the background with transformed perspectives in each sensor modality to perform data augmentation for different sensor configurations.

Machine learning techniques are used to synthesize missing data from single objects (i.e., individual OoI) as their perspectives are transformed. For large background regions, which include less salient information, computer graphics techniques can be relatively efficient and sufficiently accurate. Thus, the system and methods transform sensor data that is aligned to a desired sensor configuration across various sensor modalities. These and other features of the system and methods of the present disclosure are now described below in further detail.

Throughout the present disclosure, references are made to computer graphics techniques and machine learning techniques used by system and methods of the present disclosure. For example, the computer graphics techniques may include ray tracing. For example, the machine learning techniques may include a generative adversarial network (GAN), neural radiance fields (NeRF), and a Generative RAdiance Field (GRAF). These techniques are summarized after describing the system and methods of the present disclosure.

Figure 1:
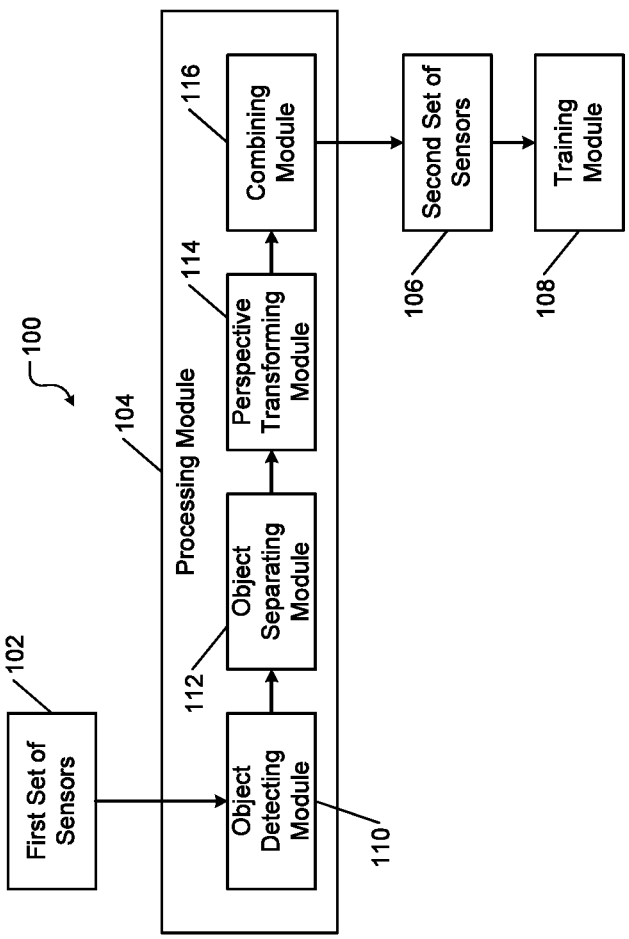
FIG. 1 shows an example of a system for transforming sensor data to train models used with different sensor configurations according to the present disclosure.

FIG. 1 shows a system 100 for transforming sensor data to different sensor configurations according to the present disclosure. The system 100 comprises a first set of sensors 102, a processing module 104, a second set of sensors 106, and a training module 108. The processing module 104 comprises an object detecting module 110, an object separating module 112, a perspective transforming module 114, and a combining module 116.

The operations of the various modules of the system 100 are explained below with reference to FIGS. 2-4. The operations are described initially briefly with reference to FIG. 2 and subsequently in detail with reference to FIGS. 3 and 4. Throughout the following description, the term control refers to one or more modules of the processing module 104.

FIG. 2 shows a method 150 for transforming sensor data from one frame of reference into the frame of reference of different sensor configurations according to the present disclosure. At 152, control (e.g., the object detecting module 110) receives data from a first sensor (e.g., the first set of sensors 102). At 154, control (e.g., elements 112, 114, 116) transforms the data. At 156, the second sensor senses the transformed data. At 158, control (e.g., the training module 108) trains the model using the transformed data sensed by the second sensor. At 160, in use, the trained model receives other data from the second sensor and outputs correct results as trained. The trained model outputs the results by recognizing the other data as if the model was trained using data directly collected by the second sensor rather than being trained based on data collected by the first sensor.

Figure 3:
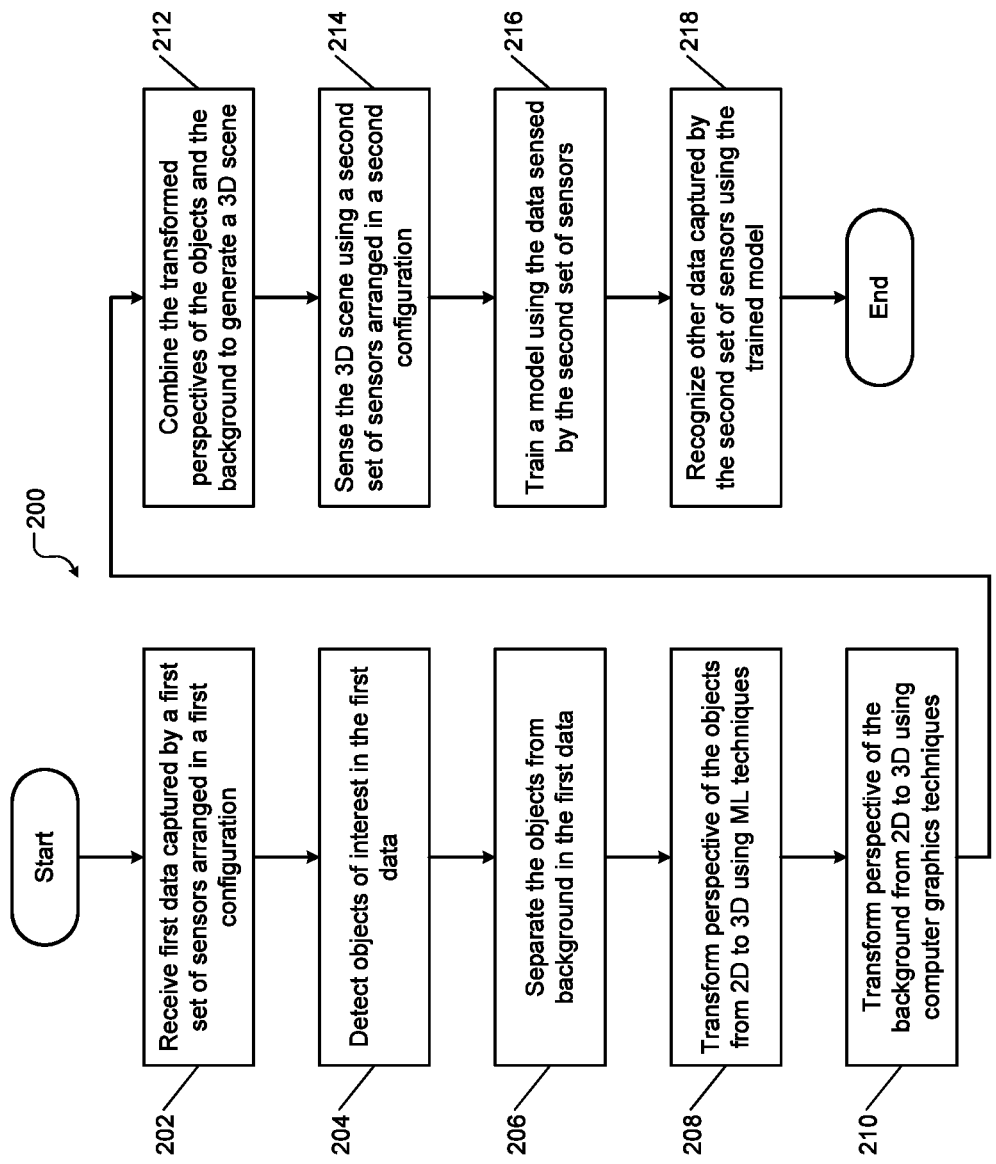
FIG. 3 shows one example of the method of FIG. 2 for transforming sensor data to train models used with different sensor configurations according to the present disclosure.

FIG. 3 shows a method 200 for transforming sensor data to train models used with different sensor configurations according to the present disclosure. At 202, control (e.g., the object detecting module 110) receives the first data captured by a first set of sensors (e.g., the first set of sensors 102) arranged in a first configuration. At 204, control (e.g., the object detecting module 110) detects objects of interest (OoI) in the first data. At 206, control (e.g., the object separating module 112) separates the objects from background in the first data.

At 208, control (e.g., the perspective transforming module 114) transforms perspectives of the objects from 2D to 3D using one or more machine learning techniques. At 210, control (e.g., the perspective transforming module 114) transforms perspectives of the background from 2D to 3D using one or more computer graphics techniques. At 212, control (e.g., the combining module 116) combines the transformed 3D perspectives of the objects and of the background to generate a 3D scene representing the first data.

At 214, a second set of sensors (e.g., the second set of sensors 106) arranged in a second configuration senses the 3D scene to generate a 3D representation of the 3D scene. The arrangement of the second sensors in the second configuration is different than the arrangement of the first set of sensors in the first configuration. At 216, control (e.g., the training module 108) trains a model (e.g., a machine learning based model) using the data sensed by the second set of sensors. That is, control trains the model using the 3D representation of the 3D scene generated by the second set of sensors.

At 218, in use, the trained model receives other data from the second set of sensors and outputs correct results as trained. The trained model outputs the results by recognizing the other data as if the model was trained using the other data directly collected by the second set of sensors rather than being trained based on data collected by the first set of sensors as described above.

Figure 4:
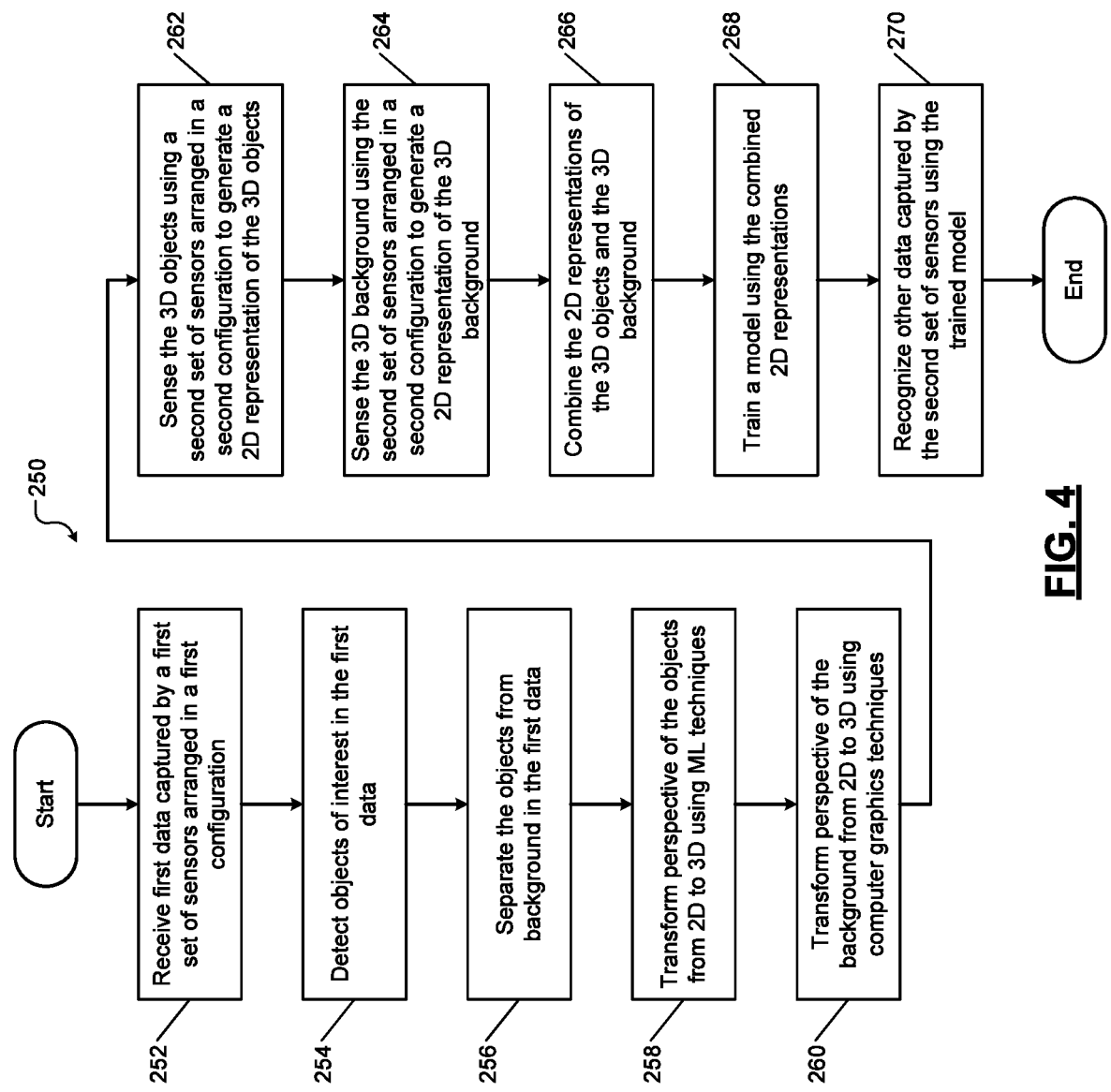
FIG. 4 shows another example of the method of FIG. 2 for transforming sensor data to train models used with different sensor configurations according to the present disclosure.

FIG. 4 shows a method 250 for transforming sensor data from one frame of reference into the frame of reference of different sensor configurations according to the present disclosure. The method 250 differs from the method 200 in that the method 200 combines 3D representations of the transformed perspectives of the objects and the background while the method 250 combines 2D representations of the transformed perspectives of the objects and the background as described below. Essentially, the method 200 places a 3D OoI in a 3D background and then senses the 3D scene with the second set of sensors whereas the method 250 senses a 3D OoI and a 3D background with the second set of sensors and places a 2D representation of the OoI in a 2D representation of the background as explained below.

At 252, control (e.g., the object detecting module 110) receives the first data captured by a first set of sensors (e.g., the first set of sensors 102) arranged in a first configuration. At 254, control (e.g., the object detecting module 110) detects objects of interest in the first data. At 256, control (e.g., the object separating module 112) separates the objects from background in the first data.

At 258, control (e.g., the perspective transforming module 114) transforms perspectives of the objects from 2D to 3D using one or more machine learning techniques. At 260, control (e.g., the perspective transforming module 114) transforms perspectives of the background from 2D to 3D using one or more computer graphics techniques.

At 262, a second set of sensors (e.g., the second set of sensors 106) arranged in a second configuration senses the 3D transformed perspectives of the objects to generate a 2D representation of the 3D transformed perspectives of the objects. The arrangement of the second sensors in the second configuration is different than the arrangement of the first set of sensors in the first configuration. At 264, the second set of sensors senses the 3D transformed perspectives of the background to generate a 2D representation of the 3D transformed perspectives of the background.

At 266, control (e.g., the combining module 116) combines the 2D representations of the 3D transformed perspectives of the objects and of the background. At 268, control (e.g., the training module 108) trains a model (e.g., a machine learning based model) using the combined 2D representations of the 3D transformed perspectives of the objects and the background.

At 270, in use, the trained model receives other data from the second set of sensors and outputs correct results as trained. The trained model outputs the results by recognizing the other data as if the model was trained using the other data directly collected by the second set of sensors rather than being trained based on data collected by the first set of sensors as described above.

The above system and methods can be used in many applications. Non-limiting examples of the applications include the following. For example, the above system and methods can be used for data augmentation in the training of various machine learning systems.

In a second use case example, the system and methods can be used with V2X (Vehicle-to-everything) communication systems and Advanced Driver Assistance Systems (ADAS). V2X is a communication between a vehicle and any entity that may affect, or may be affected by, the vehicle. V2X incorporates other more specific types of communication such as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid).

V2X defines peer-to-peer communications protocols that enable enhanced situational awareness between vehicles. V2X applications accommodate routine and urgent traffic situations ranging from cross intersection warnings and nearby emergency vehicles to blind spot warnings that help prevent accidents in connection with lane changes. Additionally, road detours for construction, traffic flow or traffic accidents can be signaled through V2X. Pedestrians may also benefit from the safety enhancements of V2X on their mobile phones.

ADAS use a human-machine interface to improve a driver's ability to react to dangers on the road. ADAS increase safety and reaction times through early warning and automated systems. Some examples of ADAS include Forward Collision Warning, High Beam Safety System, Lane Departure Warning, Traffic Signals Recognition, etc. Current ADAS functions are limited by abilities of the vehicle's sensors. V2V communication can expand ADAS functions by allowing vehicles to communicate with each other directly and share information on relative speeds, positions, directions of travel and even control inputs, such as sudden braking, accelerations or changes in direction. Combining this data with the vehicle's own sensor inputs can create a wider and more detailed picture of the surroundings and provide earlier and more accurate warnings, or corrective actions, to avoid collisions.

The above system and methods of the present disclosure can be used with V2X and ADAS as follows. For example, a first vehicle produced by a first manufacturer may relay an indication of a hazard detection via V2X. A second vehicle produced by a second manufacturer may receive the indication via V2X. Without the above systems and methods, the second vehicle accepts or rejects the hazard's existence indicated by the first vehicle. Instead, if the above systems and methods are deployed in the second vehicle, the first vehicle can include a short sequence of its sensor data and information about its sensors in the indication. The above systems and methods in the second vehicle can transform the first vehicle's sensor data to match its own configuration and use its own model (trained to process sensor data in the configuration present on the first vehicle) to analyze the hazard and reach a conclusion independently of the decision made by the first vehicle. Accordingly, rather than making a binary decision by relying on the hazard indication received from the first vehicle, the second vehicle can make a better decision on how to handle the hazard situation.

In a third use case example, an infotainment system of the vehicle employing the above system and methods can use sensor data collected from a vehicle's sensors and transform the collected data to augment a view provided to an occupant of the vehicle. The system and methods may also allow the occupant to manipulate the viewpoint of a scene captured by the vehicle's sensors to change the display of the surroundings. For example, on a touch-screen displaying the scene, the occupant may be provided with a menu comprising various configurations for the vehicle's sensors (i.e., various possible arrangements in which the sensors may be virtually arranged). The occupant can select a configuration, and the system uses the data collected by the vehicle's sensors, transforms the collected data to the selected sensor configuration using the system and methods of the present disclosure, and displays a new view of the scene on the touch-screen as if the new view is actually captured by the vehicle's sensors arranged in the selected configuration.

The following is a summary of various computer graphics techniques and machine learning techniques that may be used by the above system and methods. For example, in 3D computer graphics, ray tracing is a rendering technique for generating an image by tracing a path of light as pixels in an image plane and simulating effects of its encounters with virtual objects. Ray tracing can simulate many optical effects such as reflection, refraction, scattering, and dispersion phenomena such as chromatic aberration. Ray tracing can produce a high degree of visual realism, more so than typical scanline rendering methods, but is computationally intensive.

Path tracing is a form of ray tracing that can produce soft shadows, depth of field, motion blur, caustics, ambient occlusion, and direct lighting. Path tracing is an unbiased rendering method, but a large number of rays have to be traced to obtain high quality reference images without noisy artifacts.

The following are examples of the machine learning techniques that can be used to detect and manipulate the objects of interest as described in the above system and methods of the present disclosure. For example, a generative adversarial network (GAN) is a class of machine learning technique, which can be used to synthesize 3D objects. Given a training set, a GAN learns to generate new data with the same statistics as the training set. For example, a GAN trained on photographs can generate new photographs that have many realistic characteristics and appear at least superficially authentic.

As another example, neural radiance fields (NeRF) is a fully-connected deep network that can be trained to reproduce input views of a single scene using a rendering loss. The network receives spatial location and viewing direction (5D input) and outputs volume density and view-dependent emitted radiance at that spatial location. Volume rendering is used to differentiably render new views. To create a 3D scene, NeRF uses many images of a scene taken from different views and is therefore computationally intensive. Accordingly, NeRF is more suitable for creating static scenes like virtual museum exhibits than for dynamically changing environments with many scenes that a vehicle encounters while driving.

In other examples, a 3D object can be represented by a continuous function called a Generative RAdiance Field (GRAF). GRAF generates 3D-consistent images and uses only un-posed 2D images for training. GRAF incorporates 3D-awareness by adding a virtual camera to the model. A 3D representation of generated objects is parameterized by a 3D generator. The virtual camera and a corresponding renderer produce an image of the 3D representation. GRAF can render images from different viewpoints by controlling the pose of the virtual camera in the model. GRAF models shape and appearance separately using two disentangled latent codes and allows for modifying them separately.

These techniques primarily focus on manipulation of objects rather than dynamic scenes. However, by using these techniques in combination (i.e., by using computer graphics techniques for backgrounds and machine learning techniques for 001), the above system and methods can synthesize dynamic scenes such as those captured by cameras while driving a vehicle, which enables transforming sensor data to train models used with different sensor configurations. Specifically, as described above, the system and methods separate OoI from backgrounds and use these techniques in combination (i.e., use the machine learning techniques to transform perspectives of the OoI and use the computer graphics techniques to transform perspectives of the backgrounds) to transform sensor data to additional frames of reference.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a processor; and
a memory storing instructions which when executed by the processor configure the processor to: receive first data from a first set of sensors arranged in a first configuration;
transform the first data to a second data to train a model to recognize third data captured by a second set of sensors arranged in a second configuration,
wherein the second configuration is different than the first configuration;
train the model based on the second set of sensors sensing the second data to recognize the third data captured by the second set of sensors arranged in the second configuration;
detect one or more objects in the first data;
separate the objects from background in the first data;
transform perspectives of the objects from 2D to 3D using a machine learning based model; and
transform a perspective of the background from 2D to 3D using a computer graphics technique;
wherein the machine learning based model and the computer graphics technique are different methods.

2. The system of claim 1 wherein the trained model recognizes the third data captured by the second set of sensors arranged in the second configuration.

3. The system of claim 1 wherein at least one of the second set of sensors is different than at least one of the first set of sensors.

4. The system of claim 1 wherein the instructions configure the processor to combine the transformed perspectives of the objects and the transformed perspective of the background to generate a 3D scene representing the first data.

5. The system of claim 4 wherein the instructions configure the processor to train the model based on the second set of sensors sensing the 3D scene representing the first data.

6. The system of claim 1, wherein the instructions configure the processor to:
generate 2D representations of the 3D perspectives of the objects sensed by the second set of sensors; and generate a 2D representation of the 3D perspective of the background sensed by the second set of sensors.

7. The system of claim 6 wherein the instructions configure the processor to combine the 2D representations of the 3D perspectives of the objects and the 2D representation of the 3D perspective of the background sensed by the second set of sensors.

8. The system of claim 7 wherein the instructions configure the processor to train the model based on the combination of the 2D representations of the 3D perspectives of the objects and the 2D representation of the 3D perspective of the background sensed by the second set of sensors.

9. A method comprising:
receiving first data from a first set of sensors arranged in a first configuration;
transforming the first data to a second data to train a model to recognize third data captured by a second set of sensors arranged in a second configuration,
wherein the second configuration is different than the first configuration; and
training the model based on the second set of sensors sensing the second data to recognize the third data captured by the second set of sensors arranged in the second configuration;
detecting one or more objects in the first data;
separating the objects from background in the first data;
transforming perspectives of the objects from 2D to 3D using a machine learning based model; and
transforming a perspective of the background from 2D to 3D using a computer graphics technique;
wherein the machine learning based model and the computer graphics technique are different methods.

10. The method of claim 9 further comprising recognizing, using the trained model, the third data captured by the second set of sensors arranged in the second configuration.

11. The method of claim 9 wherein at least one of the second set of sensors is different than at least one of the first set of sensors.

12. The method of claim 9 further comprising combining the transformed perspectives of the objects and the transformed perspective of the background to generate a 3D scene representing the first data.

13. The method of claim 12 further comprising training the model based on the second set of sensors sensing the 3D scene representing the first data.

14. The method of claim 9 further comprising:
generating 2D representations of the 3D perspectives of the objects sensed by the second set of sensors; and
generating a 2D representation of the 3D perspective of the background sensed by the second set of sensors.

15. The method of claim 14 further comprising combining the 2D representations of the 3D perspectives of the objects and the 2D representation of the 3D perspective of the background sensed by the second set of sensors.

16. The method of claim 15 further comprising training the model based on the combination of the 2D representations of the 3D perspectives of the objects and the 2D representation of the 3D perspective of the background sensed by the second set of sensors.

\* \* \* \* \*